(12) United States Patent
Hsu

(10) Patent No.: US 8,443,665 B2
(45) Date of Patent: May 21, 2013

(54) FREQUENCY MODULATED MICRO GYRO

(75) Inventor: Ying W. Hsu, San Clemente, CA (US)

(73) Assignee: Ying W. Hsu, San Clemente, CA (US)

( * ) Notice: Subject to any disclaimer, the term of this patent is extended or adjusted under 35 U.S.C. 154(b) by 760 days.

(21) Appl. No.: 12/581,003

(22) Filed: Oct. 16, 2009

(65) Prior Publication Data

US 2010/0095770 A1 Apr. 22, 2010

Related U.S. Application Data

(60) Provisional application No. 61/196,689, filed on Oct. 21, 2008.

(51) Int. Cl.
*G01C 19/56* (2012.01)
(52) U.S. Cl.
USPC .................................................. 73/504.12
(58) Field of Classification Search
USPC .................................................. 73/504.12
See application file for complete search history.

(56) References Cited

U.S. PATENT DOCUMENTS

| | | | |
|---|---|---|---|
| 6,089,089 A | 7/2000 | Hsu | |
| 6,467,348 B1 * | 10/2002 | Song et al. | 73/504.12 |
| 6,578,420 B1 | 6/2003 | Hsu | |
| 6,731,121 B1 | 5/2004 | Hsu et al. | |
| 7,389,690 B2 | 6/2008 | Robert | |
| 2006/0032306 A1 * | 2/2006 | Robert | 73/504.02 |

OTHER PUBLICATIONS

Roessig, Trey A., et al., "Surface-Micromachined Resonant Accelerometer", Trnasducers '97, 1997 International Conference on Soild-State Sensors and Actuators, Chicago, Jun. 16-19, 1997, 3B2.02, Berkeley Sensor & Actuator Center, 497 Cory Hall, University of California, Berkeley, CA 94720-1774, USA, Sandia National Laboratories, Albuquerque, NM 87185-1080, USA, (1997), pp. 859-862.
Seshia, Ashwin A., et al., "A Vacuum Packaged Surface Micromachined Resonant Accelerometer", Journal of Microelectromechanical Systems, vol. 11, No. 6, 1057-7157/02, 2002 IEEE, (Dec. 2002), pp. 784-793.
Seshia, Ashwin A., et al., "An Integrated Microelectromechanical Resonant Output Gyroscope", In Proceedings, 15th IEEE Micro Electro Mechanical Systems Conference, Las Vegas, NV, 497 Cory Hall, Dept. of Electrical Engineering and Computer Sciences, University of California, Berkeley, CA 94720, USA. Sandia National Laboratories, Albuquerque, NM 87185, USA., (Jan. 20-24, 2002).

* cited by examiner

*Primary Examiner* — John Chapman, Jr.
(74) *Attorney, Agent, or Firm* — Blakely, Sokoloff, Taylor & Zafman LLP

(57) ABSTRACT

A micro gyro consisting of a vibrating micro scale structure produces a signal whose characteristic frequency shifts in proportion to the applied angular velocity. The vibrating structure consists of a suspended proof mass resonator supported on springs and connected to at least one detector resonator. The structure can be made with multiple semiconductor materials such as silicon, poly-silicon, silicon dioxide, and silicon nitride, using one of many MEMS fabrication processes. The proof mass resonator is designed to have two closely coupled resonant frequencies, with one resonant mode for the drive motion and the second resonant mode for the sense motion. Detector resonators are connected to the vibrating structure such that when the proof mass resonator oscillates due to the Coriolis force in its sense mode, the connections to the detector resonators are stressed by the proof mass resonator, thus changing the resonant frequency of the detector resonators. By measuring the shift in the resonant frequency of the detectors, the applied angular rate can be determined.

21 Claims, 4 Drawing Sheets

FREQUENCY MODULATED MICRO GYRO

CROSS REFERENCE TO RELATED PATENT APPLICATION

This patent application claims priority to U.S. provisional patent application Ser. No. 61/196,689, titled Frequency Modulated Micro Gyro, filed on Oct. 21, 2008.

FIELD OF THE INVENTION

The invention relates to sensing devices which uses gyroscopic principles, i.e., measuring the Coriolis force created by the conservation of momentum of a vibratory body subjected to an angular velocity. Specifically, the invention concerns devices called micro gyros which are small, robust, and inexpensive.

BACKGROUND

Micro gyros are angular velocity sensors used widely in the automotive, aerospace, consumer, and industrial applications. Unlike conventional mechanical and optical gyroscopes which are relatively large and are fabricated using complex and precision assembly, micro gyros are small and batch-produced using semiconductor wafer fabrication process. One processing technology commonly used for fabrication of the micro gyros is the Micro-Electro-Mechanical Systems (MEMS) technology. Micro gyros made using MEMS are very small with the smallest features measuring only a few micrometers long. With very small features and precise processing control, MEMS micro gyros are highly reliable and robust.

Processes for manufacturing MEMS micro gyro devices are well documented in the literature. Examples of MEMS devices are disclosed in U.S. Pat. No. 6,089,089, "Multi-Element Micro Gyro", to Hsu; and U.S. Pat. No. 6,578,420, "Multi-Axis Micro-Gyro Structure", to Hsu, and the entirety of each of which is fully incorporated by reference herein.

The operating principles of vibratory micro gyros are well understood and widely reported in the literature. Generally, a small mass (often referred to as the proof mass resonator) is supported by springs (or flexures) and suspended over a substrate. Through a range of actuation forces, such as electrostatic, thermal or magnetic force, the proof mass resonator is driven to oscillate linearly or rotationally about a first axis (the Drive axis). When the substrate, along with the oscillating mass, is rotated at an angular rate about a second axis (the Rate axis), a virtual force is produced about the third axis (the Sense axis). The three referenced axis (Drive, Rate, and Sense axes) are mutually orthogonal to each other. The resulting output force, known as the Coriolis force, is proportional to the product of the linear velocity of the oscillating mass and the externally applied angular velocity. The Coriolis force acts on the proof mass resonator about the Sense axis, resulting in a small displacement that can be measured using special detectors. The methods of measuring the displacement of the proof mass resonator vary depending on the individual design; commonly used techniques include measuring changes in electrical capacitance, electrical resistance, piezoelectric voltage, piezoelectric resistivity, magnetic field intensity, and optical intensity.

Among the detection techniques mentioned above, measuring the displacement by electrical capacitance is commonly used. With proper compensation circuits, capacitance measurements can be highly accurate and stable over a large temperature range. For very low angular rates, the magnitude of the Coriolis force produced by the proof-mass can be very small (pico-Newtons), hence the displacements of the proof mass resonator are also extremely small (pico-meters). To measure such small displacements, a capacitor is formed by using the proof mass resonator as a moveable electrode and by placing a stationary electrode positioned at a small offset distance from the proof mass resonator. A variety of electronic circuits are used to convert changes in capacitance to voltage (or current); these circuits can be easily found in literature and are well known to those skilled in the art of electronic circuit design. Commercial integrated circuits (or chips) designed for capacitance detection are also available. An example of the circuit designs for capacitance detection is disclosed in U.S. Pat. No. 6,731,121, "Highly Configurable Capacitive Transducer Interface Circuit", to Hsu et al, the entirety of which is fully incorporated by reference herein.

Virtually all currently manufactured micro gyros produce output signals in which the amplitude is proportional to angular rate. In other words, most micro gyros act as transducers that modulate a carrier signal's amplitude in proportion to angular rate. Signal transmission using amplitude modulation is common and is particularly well known for the Amplitude Modulated or AM radio transmission. Although widely used, amplitude modulation has significant limitations. Even with the best filtering methods (such as Phase Lock Loop), many sources of noise still pass through the filter; thus, many leading micro gyros yield only moderate performance as compared to the optical or mechanical gyros. The wide range of noise sources include drive signal cross-talk, quadrature error, parasitic capacitance, circuit noise, voltage source noise, as well as electrical signal anomalies due to manufacturing imperfection, environmental and packaging stresses.

An alternate signal transmission technique that performs superior to amplitude modulation is the frequency modulation. This approach produces an output signal with a carrier frequency that shifts proportionally to the input rate. Frequency modulation can significantly improve micro gyro performance due to it superior noise suppression capability. Although it is possible to design circuits that digitize an amplitude modulated signal and convert it into a frequency modulation, such approach introduces additional noise in the conversion process. The ideal micro gyro design is a transducer element that intrinsically produces an output signal whose frequency shifts proportionally to the Coriolis force. A wide range of circuit designs are commonly used for demodulating frequency modulated signals and are well known to those of ordinary skill in the art of signal transmission circuit design. For micro gyro applications, what is lacking to take advantage of the frequency modulation is the gyro transducer element. An intrinsically frequency modulated micro gyro transducer is the motivation for this invention.

A new design approach and fabrication solution is needed to achieve the higher performance of frequency modulated micro gyros. The claimed invention overcomes the above discussed limitations of the amplitude modulated micro gyros, thus yielding higher resolution, while retaining the benefits of small size, robust structure, and ease of fabrication.

SUMMARY OF INVENTION

A micro gyro comprises of a ring structure suspended over a substrate by an air gap and supported by a first set of springs and connected to a set of oscillation detectors. The support springs are configured to enable the ring structure to vibrate in resonance about a first (the Drive) axis and a second (the Sense) axis. The Drive and Sense axes are orthogonal to each other, and the resonance frequencies of the ring structure about the two axes are nearly the same. A set of electrodes are placed on the substrate and adjacent to the ring structure. The electrodes vibrate and sense the ring structure about the drive axis at its natural resonant frequency. When the vibrating ring structure is subjected to an angular velocity about a third (the Rate) axis, which is orthogonal to both the Drive and the Sense axes, the ring structure vibrates about the Sense axis. The vibration of the ring structure about the Sense axis induces stress into the oscillation detector structure, resulting in a shift in the natural resonant frequency of the oscillation detectors. The angular rate can be determined by measuring the shift in the frequency of the oscillation detectors.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF EMBODIMENT OF THE INVENTION

Figure 1:
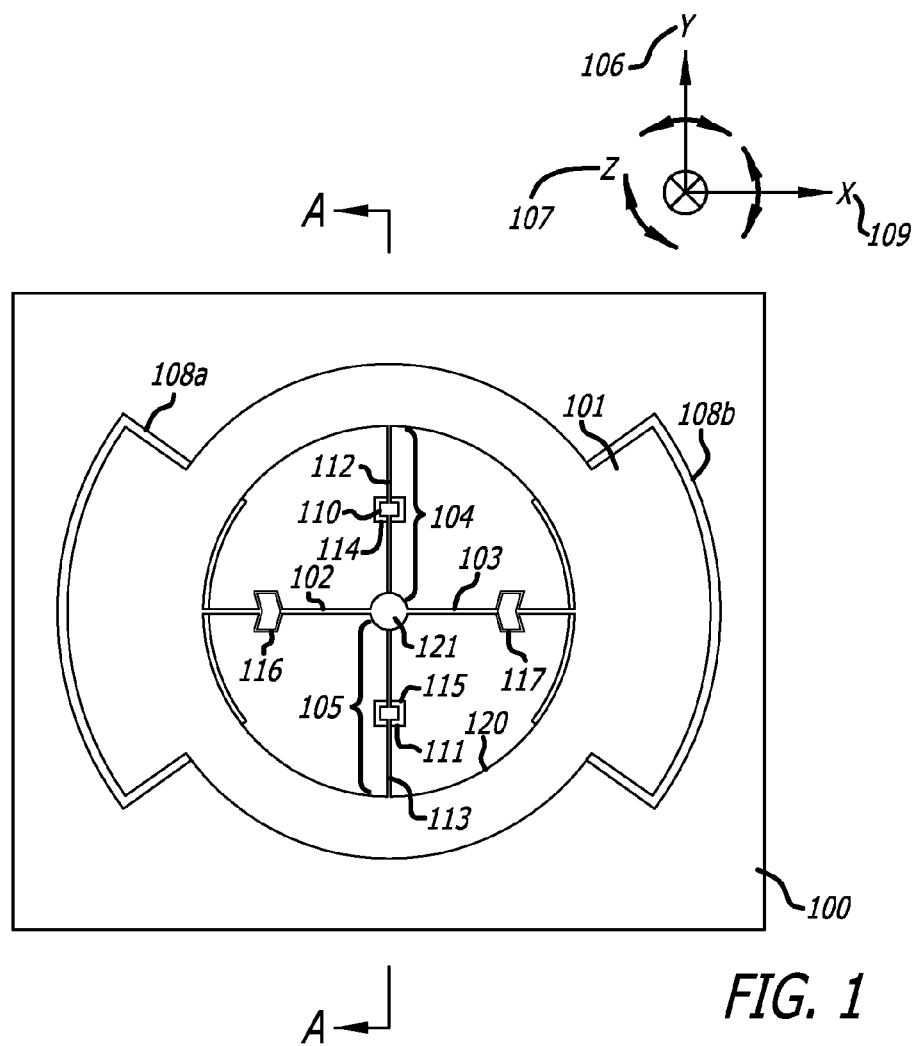
FIG. 1 is a plan view of an exemplary embodiment of the micro gyro of the invention.

Shown in FIG. 1 is an embodiment of the micro gyro concept that produces a signal whose frequency changes proportionally to the Coriolis force. The Frequency Modulated Micro Gyro (FM Microgyro) is a micro scale structure fabricated with the MEMS process and resides on a substrate. The micro structure and the substrate 100 are generally made with several semiconductor materials, such as silicon, silicon oxide and silicon nitride. For higher temperature applications, silicon carbide is also used. The FM Microgyro consists of a proof mass resonator 101, support springs 102-103, and detector resonators 104-105. The proof mass resonator 101 is a ring shaped element supported by the springs 102-103 and suspended above the substrate 100. The springs 102-103 are connected on one end to the ring element to its inside diameter 120, and on the opposite end to a stationary post, often referred to as the anchor 121. The springs 102-103 are designed to enable the proof mass resonator 101 to vibrate rotationally in resonance about the Drive axis 106 (Y-axis) and Sense axis 107 (Z-axis). In operation, the proof mass resonator 101 is driven to vibrate about the Drive axis 106 by the electrodes 108a-108b underneath. When the substrate is rotated about the Rate axis 109 (X-axis), the Coriolis force produced would vibrate the proof mass resonator 101 about the Sense axis 107. The resonant frequencies of the proof mass resonator 101 vibrating about the Drive axis 106 and Sense axis 107 are designed to be as close as possible so that the small vibration due to the Coriolis force can be transferred efficiently between the two resonant modes.

The output vibration of the proof mass resonator 101 due to the Coriolis force is measured by the detector resonators 104-105. These detectors consist of actuators, such as plates 110-111 that are supported by beam structures 112-113 and attached to the proof mass resonator 101 and the anchor 121. Although FIG. 1 shows a pair of detector resonators, only one detection resonator is needed. A pair of detector resonators provides symmetry to the FM Microgyro and helps balancing the proof mass resonator 101. The small plate 110-111 and the beam structures 112-113 are designed to resonate at frequencies substantially higher than resonant frequencies of the proof mass resonator 101 supported by the springs 102-103. To achieve this high resonant frequency, the detector resonators 104-105 are made substantially thinner than the proof mass resonator 101 and its support springs 102-103. To establish a signal with a reference frequency, the detector resonators 104-105 are driven to oscillate about its natural frequency, and maintained at that frequency by using electronic control circuits. The detector resonators 104-105 can be actuated in a number of ways, such as by electrostatic, magnetic, or piezoelectric forces. The actuation and the sensing electrodes 114-115 are placed underneath the small plates 110-111. Once the detector resonators 104-105 are oscillating at its resonant frequency, any stress in the connecting beams 112-113 would cause a change in its resonant frequency. When the proof mass resonator 101 vibrates rotationally about the Sense axis 107, the beams 112-113 of the detector resonators 104-105 are alternately stretched. The resulting stress on the beams 112-113 causes its resonant frequency to shift. The mechanism of the resonant frequency shift depicted works similarly to the changes in the tones of the guitar string when it is being tuned. When struck, the guitar string vibrates to produce a tone that is characteristic of its resonant frequency. When the string is stretched as occurred in tuning, the resonant frequency of the string shifts, and the string produces a different tone.

The design of the proof mass resonator and its support springs are important to maximizing the sensitivity of the FM Microgyro. As mentioned in previous paragraph, the sensitivity of the micro gyro depends on how well the resonant frequencies are matched between the drive and the sense modes. Matching the resonant frequencies is commonly achieved by carefully designing the geometries of the proof mass resonator 101 and of the support springs 102-103. Additionally, non-linear behavior of the spring must also be considered in the design. For example, in FIG. 1, ring structures 116-117 in the shape of a Chevron® sign are inserted into the support springs 102-103. These ring structures 116-117 allow the proof mass resonator to rotate about the Sense axis 107 (Z-axis) without the stiffening effect due to the non-linearity. The compliance of the ring structures 116-117 ensure the output of the micro gyro remain linear over the full range of input angular rates. Although FIG. 1 shows an embodiment of the FM Microgyro with separate and multiple support springs 102-103 and detector resonators 104-105, these elements may be combined into a pair of support beams. Integrating different functions into a pair of beams, however, will make designing the beams more challenging. The single beam structure will need to achieve multiple requirements, such as matching the Drive and the Sense resonant frequencies of the proof mass resonator and obtaining high resonant frequencies of the detector resonator.

Figure 2:
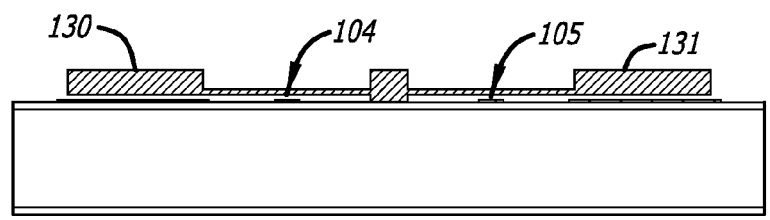
FIG. 2 is cross-section of the micro gyro element along a section line A-A depicted in FIG. 1.

FIG. 2 illustrates a cross section view along the sectional line A-A in FIG. 1. As discussed in the previous paragraph, the thickness of the detector resonators 104-105 are substantially thinner than the thickness of segments 130-131 of the proof mass resonator 101 and its support springs (not shown).

The exact thicknesses depend on the proof mass resonator size, desired operating frequencies, and fabrication limitations. The selection of the structural element thickness and other detailed design of FM Microgyro can be accomplished by analyzing the structure using methods and simulation tools well known to those with ordinary skill in the art of MEMS structure design.

Figure 3:
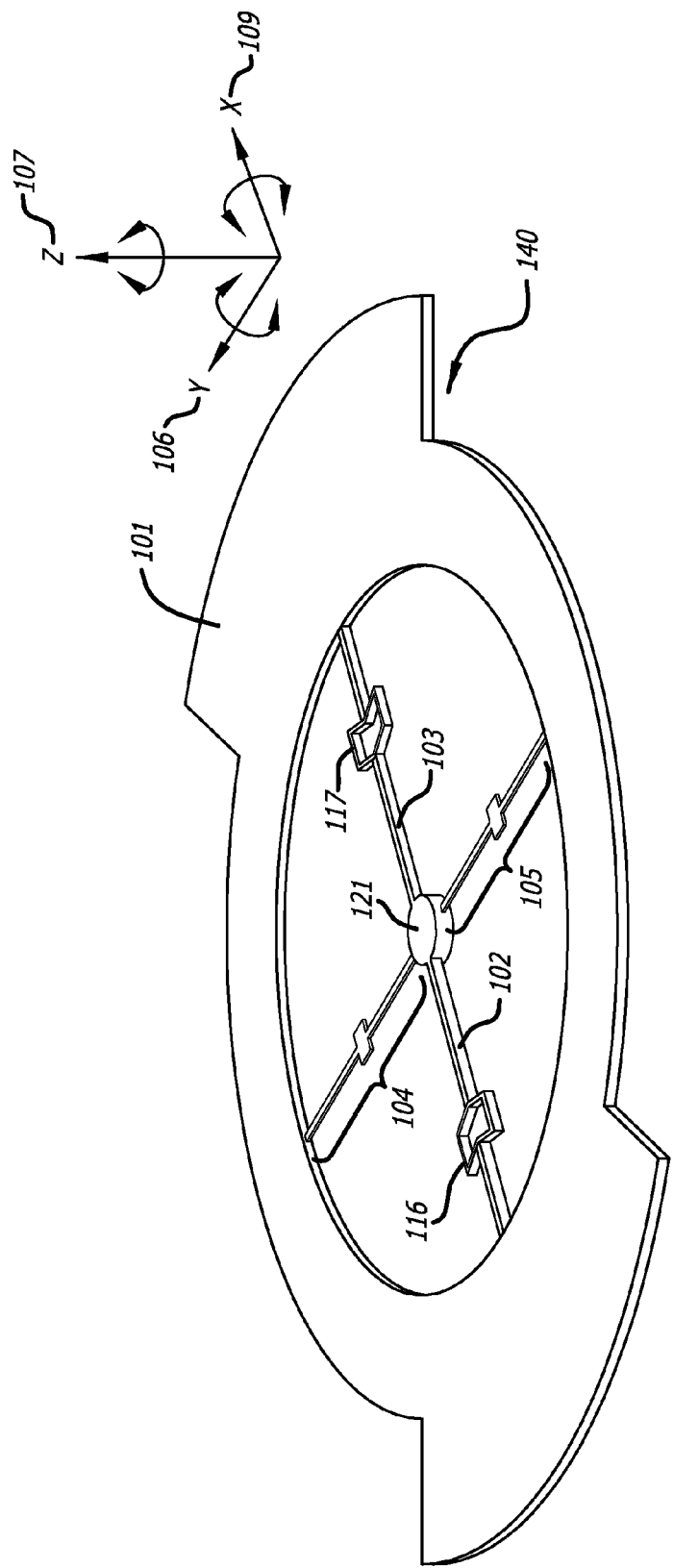
FIG. 3 is perspective view of the micro gyro of the invention depicted in FIG. 1.

The views presented in FIG. 1 and FIG. 2 are further clarified by the perspective view of the FM Microgyro shown in FIG. 3. For clarity, the electrodes underneath the micro gyro and the substrate are not shown. The proof mass resonator 101 is driven rotationally about the Drive axis 106 (Y-axis) and the Coriolis force is generated about the Sense axis 107 (Z-axis). The angular Rate is introduced about the X-axis 109. The proof mass resonator 101 is supported by two springs 102-103 with the ring structures 116-117, and connected to the anchor 121 in the center. The anchor 121 is raised above the substrate (not shown), thus elevating the proof mass resonator above the substrate with an air gap 140 and enabling it to freely vibrate. The amount of the air gap 140 offset is determined by process limitation, actuation force, and sensing accuracy (if capacitive sensing is used). The different thickness of the proof mass resonator 101 and springs 102-103 and the thickness of the detector resonators 104-105 are clearly illustrated. Based on prior MEMS micro gyros designs, the size of the proof mass resonator are typically a few millimeters, and the thickness of the proof mass resonator is typically a few to tens of microns. With these dimensions, the operating resonant frequencies of the proof mass resonator 101 are typically several thousand cycles per second. The thickness of the detector resonators 104-105 will likely to be a few micrometers thick, limited primarily by the fabrication process. The MEMS processing technology, however, is continuing to change and new micro gyro size and spring dimensions will certainly be developed.

Figure 4:
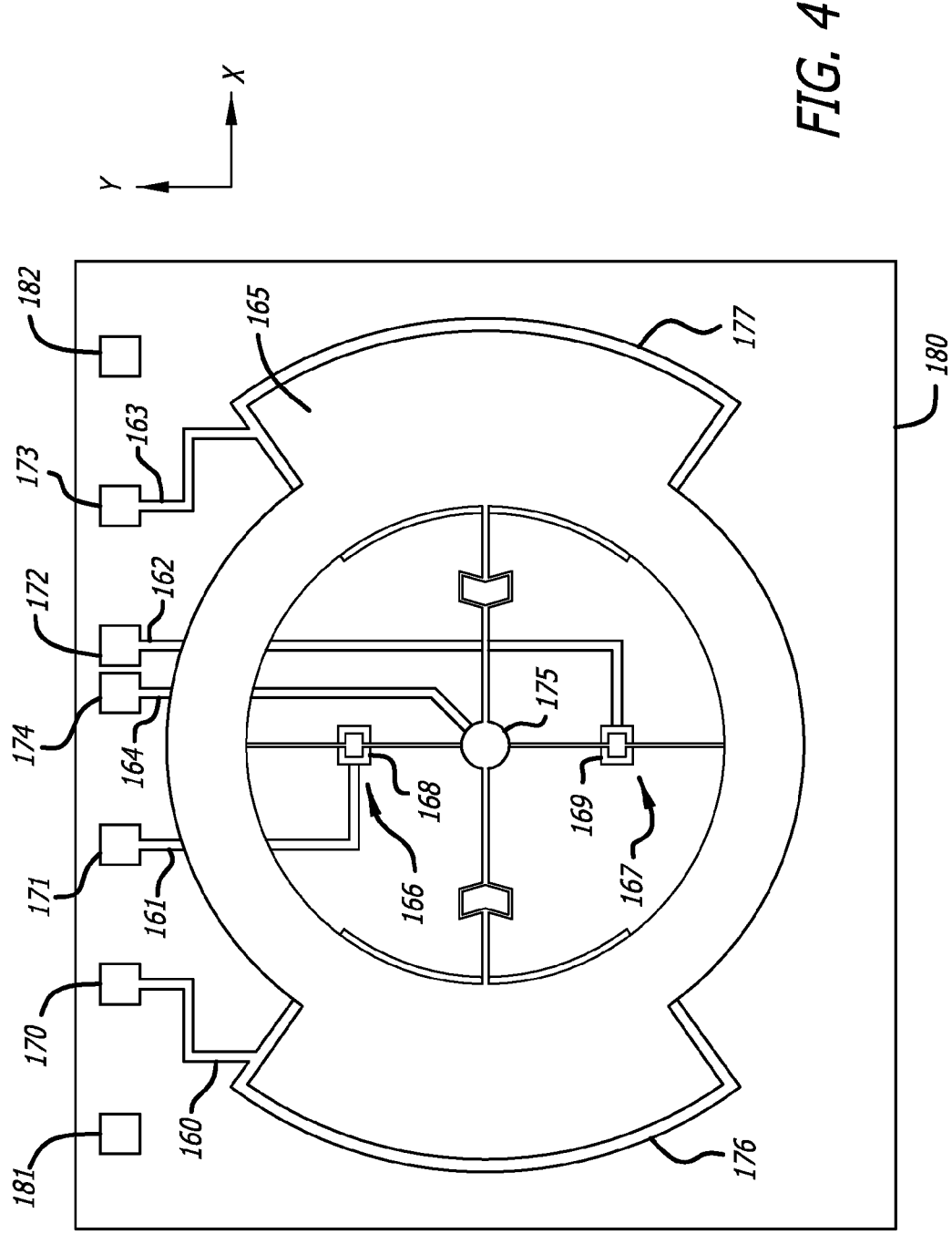
FIG. 4 is a plan view of an exemplary embodiment of the micro gyro with actuation and sensing electrodes shown connected to the wire bond pad on the chip.

The operation of the FM Gyro requires actuating the proof mass resonator and the detector resonators, as well as sensing their motions. As mentioned in previous paragraph, these functions can be accomplished by a number of techniques. FIG. 4 illustrates routing traces 160-163 interconnecting electrodes for actuating and sensing the proof mass resonator 165 and detector resonators 166-167 to the bond pads 170-173. The bonds are used to interface with the external electronic circuits. The proof mass resonator 165 is actuated by electrodes 176-177 located underneath. These electrodes 176-177 are formed typically using thin layers of conductive film, such as poly-silicon, aluminum, or other metals. For electrical isolation, the electrodes 176-177 are typically placed on a dielectric material such as silicon dioxide or silicon nitride. The designs of these electrodes are generally dictated by the MEMS process chosen and limited by its process design rules. To energize the electrodes 176-177, conductive traces 160, 163 connect the electrodes to wire bond pads 170, 173, generally placed on the periphery of the chip 180 for easy access. The bond pads 170-174 are connected to electronic circuits typically by wire bonds or solder balls.

Shown in FIG. 4 are also conductive traces 161-162 which connects bond pads to electrodes 168-169 used for the detector resonators 166-167. The proof mass resonator 165 is electrically connected through the anchor 175 and through the routing trace 164 to the bond pad 174. The locations of conductive traces 161-162 should be carefully designed to ensure minimum signal cross talk and other electrical signal feed-through that can overwhelm the extremely low micro gyro signals. Micro gyros are also susceptible to electromagnetic interference and charge accumulation (if using capacitive actuation and sensing). To minimize the effect of electromagnetic interference and charge migration, and to provide a sealed environment for the micro gyro element (typically in vacuum), the micro gyro is capped with a top silicon substrate. The top and the bottom substrates are electrically shielded by connecting the two substrates to an electrical ground. FIG. 4 further illustrates two corner bond pads 181-182 that are electrically connected to the substrate 180. The bond pads are typically covered with a thin conductive film such as aluminum, or the pads are implanted with ions to reduce electrical resistivity.

Figure 5A:
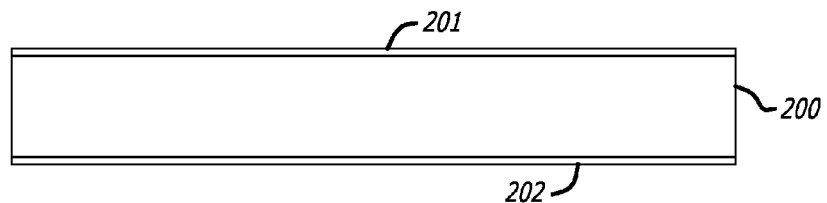
FIG. 5 illustrates processing operations of the fabrication of a MEMS embodiment of the micro gyro of the invention.
Figure 5B:
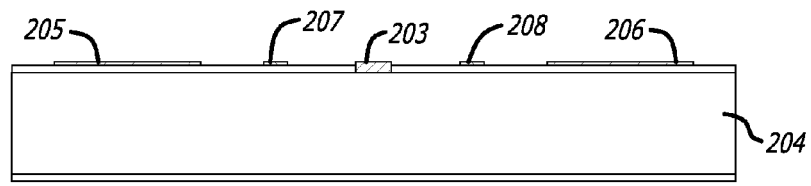
Figure 5C:
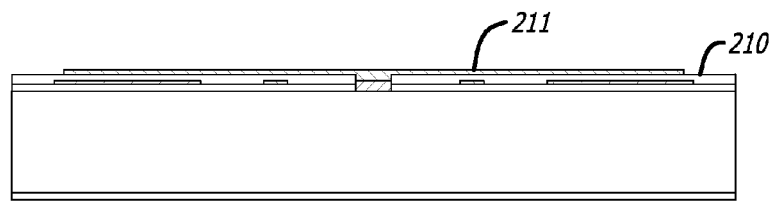
Figure 5D:
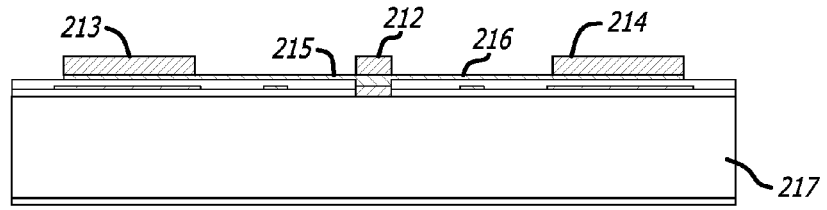
Figure 5E:
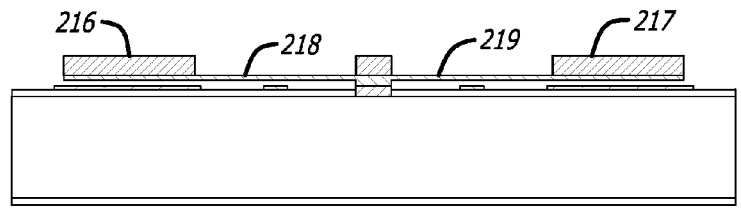

Turning now to FIGS. 5A-5E, a method of fabricating the FM Microgyro is illustrated. The fabrication of the FM Microgyro can be accomplished using one of many MEMS processes. A simplified deposit and etch process is described in this section. FIG. 5A shows a silicon substrate 200 with thermally grown silicon dioxide layers 201-202 on the surfaces. The silicon dioxide films 201-202 serve as electrical isolation layers. In FIG. 5B, through a series of deposition and lithography commonly used in MEMS process, an anchor 203 is formed on the substrate 204 and it is mechanically and electrically connected to the substrate 204. A series of electrodes 205-208 made with either aluminum or conductive poly-silicon are also deposited and patterned. The next operation, as shown in FIG. 5C, is to deposit a layer of sacrificial material 210 (typically an oxide) that will be used to offset the proof mass resonator above the substrate and will be removed later in the final release of the structure. The sacrificial material 210 is deposited and leveled by Chemical Mechanical Polishing to ensure a flat topography. The next operation is to fabricate the detector resonators by depositing and patterning a thin structural layer 211 with a material such as poly-silicon. The poly-silicon should be electrically conductive in order for it to be actuated by electrostatic force. This first structural layer 211 will serve not only as the detector resonator structure, but also as the first tier of the proof mass resonator and the springs. A hard mask using oxide will be needed to pattern this layer. The next operation is to deposit the remaining thickness of the proof mass resonator. As shown in FIG. 5D, a series of deposition and patterning operations will be required to create a thick structure to form the proof mass resonator 212-213. Poly-silicon is again a material that can be used for this operation. The last processing operation is the removal of the sacrificial material 215 that holds the proof mass resonator 213-214 and the detector resonators 215-216 to the substrate 217. For the poly-silicon MEMS process described, a wet etch will be required to remove the sacrificial material. Although not illustrated in FIG. 5D, the proof mass resonator layer 213-214 and the detector resonator layer 215-216 are patterned with etching holes that would allow the etchant to seep through the poly-silicon to etch the sacrificial material. FIG. 5E illustrates the completed FM Microgyro after removal of the sacrificial material; the proof mass resonator 216-217 and the detector resonators 218-219 are free to move.

Additional post processing operations are generally required, but are not illustrated in FIGS. 5A-5E. For example, a top cover with a cavity is generally bonded to the substrate to provide a sealed cavity for the micro gyro element. A vacuum environment of a 100 mTorr or less is generally needed to increase the response of the micro gyro. The bonding of the capping wafer may be accomplished by one of many wafer bonding techniques, including fusion, metal, glass-frit, and others. The bonded wafer is diced to separate the individual micro gyros for packaging. These post processing operations are commonly practiced by those with ordinary skill in the art of MEMS design and fabrication.

Other MEMS process can also be used to produce the FM Microgyro. For example, instead of a using poly-silicon as the structural material, single-crystal silicon can also be used. Such a process would start with the Silicon-on-Insulation (SOI) process to create the desired structural thicknesses, and follow by a combination of dry and wet etching to pattern and release the final structure. Still there are other MEMS processes that may be used for fabricating the FM Microgyro and these processes are well known to those with ordinary skill in the art of MEMS design and fabrication.

Many alterations and modifications of the invention may be further made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

What is claimed is:

1. A device for measuring angular rate fabricated on a substrate, comprising:
   a proof mass resonator;
   at least one detector resonator coupled to the proof mass resonator, the at least one detector resonator being oscillated at a first resonant frequency and being altered to oscillate at a second resonant frequency in response to a resultant force produced by rotating the proof mass resonator at an angular rate;
   a stationary element raised above the substrate;
   a first ring structure; and
   a first support spring coupled between the stationary element and an edge forming part of an inside diameter of the proof mass resonator, the first support spring supporting the first ring structure.

2. The device of claim 1, wherein the at least one detector resonator comprises a first detector resonator and a second detector resonator, the first detector resonator comprises a first actuator coupled to the proof mass resonator.

3. The device of claim 2, wherein the at least one detector comprises a means for oscillating the first actuator at the second resonant frequency that is higher than the first resonant frequency, the second resonant frequency being caused by the resultant force being a Coriolis force.

4. The device of claim 2, wherein the second detector resonator comprises a second actuator coupled to the proof mass resonator.

5. The device of claim 1 further comprising means for oscillating the at least one detector resonator.

6. The device of claim 1 further comprising (i) a plurality of electrodes each uniquely corresponding to the at least one detector resonator, wherein the at least one detector being one of a first detector resonator and a second detector resonator, and (ii) a plurality of traces each coupled to one of the plurality of electrodes, the plurality of electrodes and the plurality of traces being energized to oscillate the first detector resonator and the second detector resonator.

7. The device of claim 1 further comprising:
   a second ring structure; and
   a second support spring coupled between the stationary element and the proof mass resonator, the second support spring supporting the second ring structure.

8. The device of claim 1, wherein the proof mass resonator is operable in a drive resonant mode and sense resonant mode with the drive resonant mode being a mode of operation with a rotation of the proof mass resonator about a first axis and the sense resonant mode being a mode of operation with a rotation of the proof mass resonator being about a second axis that is orthogonal to the first axis.

9. The device of claim 8, wherein the first axis is parallel to a plane of the substrate and the second axis is perpendicular to the plane of the substrate.

10. The device of claim 8, where in the angular rate to be measured is applied about an axis that is orthogonal both to the first axis and the second axis.

11. The device of claim 1 further comprising means for oscillating the at least one detector resonator at a resonant frequency that is higher than the resonant frequency of the proof mass resonator.

12. A sensing device fabricated on a substrate, comprising:
   a proof mass resonator;
   a first detector resonator coupled to and substantially surrounded by the proof mass resonator, the first detector resonator being oscillated at a first resonant frequency, the first resonant frequency being changed in response to a resultant force produced by angular rotation of the proof mass resonator;
   a stationary element raised above the substrate;
   a first ring structure; and
   a first support spring coupled between the stationary element and the proof mass resonator, the first support spring supporting the first ring structure, wherein the sensing device being operable in a drive resonant mode and a sense resonant mode with the drive resonant mode being a mode of operation with a rotation of the proof mass resonator about a first axis parallel to a plane of the substrate and the sense resonant mode being a mode of operation with a rotation of the proof mass resonator being about a second axis perpendicular to the plane of the substrate so that the angular rate is applied along an axis that is orthogonal to both the first axis and the second axis.

13. A device for measuring angular rate fabricated on a substrate, comprising:
   a proof mass resonator;
   at least one detector resonator coupled to the proof mass resonator, the at least one detector resonator being oscillated at a first resonant frequency and being altered to oscillate at a second resonant frequency in response to a resultant force produced by rotating the proof mass resonator at an angular rate;
   a stationary element raised above the substrate;
   a first ring structure; and
   a first support spring coupled between the stationary element and the proof mass resonator, the first support spring supporting the first ring structure,
   wherein the proof mass resonator is a ring shaped element that is suspended above a substrate by a plurality of support springs, each of the plurality of support springs being coupled at one end to an inside edge of the proof mass resonator.

14. The sensing device of claim 12 further comprising means for oscillating the first detector resonator at the first resonant frequency that is higher than a resonant frequency of the proof mass resonator.

15. The sensing device of claim 12 further comprising a second detector resonator being oscillated at a second resonant frequency, the second resonant frequency being changed in response to the resultant force produced by the angular rotation of the proof mass resonator.

16. The sensing device of claim 15 further comprising (i) a plurality of electrodes each corresponding to one of the first detector resonator and the second detector resonator, and (ii) a plurality of traces each coupled to one of the plurality of electrodes, the plurality of electrodes and the plurality of traces being energized to oscillate the first detector resonator and the second detector resonator.

17. The sensing device of claim 12, wherein the first detector resonator comprises a first actuator coupled to the proof mass resonator.

18. The sensing device of claim 17, wherein the first detector resonator comprises a means for oscillating the first actuator at a resonant frequency that is substantially different than a resonant frequency of the proof mass resonator.

19. The sensing device of claim 12 further comprising means for oscillating the first detector resonator.

20. A method of measuring changes in motion using a micro gyro, comprising:
   oscillating a detector resonator at a first resonant frequency;
   oscillating rotationally a proof mass resonator at a resonant frequency substantially different from the first resonant frequency, wherein the proof mass resonator being coupled to the detector resonator;
   changing a frequency for the detector resonator to a second resonant frequency in response to a Coriolis force produced by a change of motion of the proof mass resonator; and
   measuring a rate of motion of the proof mass resonator based on a shift in the resonant frequency of the detector resonator from the first resonant frequency to the second resonant frequency.

21. The method of claim 20, wherein the rate of motion being angular motion of the proof mass resonator.

* * * * *